US008125692B2

(12) United States Patent
Chae

(10) Patent No.: US 8,125,692 B2
(45) Date of Patent: Feb. 28, 2012

(54) IMAGE FORMING DEVICE TO DETERMINE UNIFORMITY OF IMAGE OBJECT AND METHOD THEREOF

(75) Inventor: Won-seok Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1884 days.

(21) Appl. No.: 11/262,661

(22) Filed: Nov. 1, 2005

(65) Prior Publication Data

US 2006/0092478 A1 May 4, 2006

(30) Foreign Application Priority Data

Nov. 2, 2004 (KR) ......................... 10-2004-0088342

(51) Int. Cl.
*H04N 1/40* (2006.01)
(52) U.S. Cl. .................... 358/448; 358/3.26; 382/173
(58) Field of Classification Search .................. 382/176, 382/195, 239, 173; 358/448, 3.26
See application file for complete search history.

(56) References Cited

U.S. PATENT DOCUMENTS

| | | | | |
|---|---|---|---|---|
| 4,729,035 A | * | 3/1988 | Tanioka | 382/237 |
| 5,659,357 A | * | 8/1997 | Miyano | 348/223.1 |
| 5,680,477 A | * | 10/1997 | Asada | 382/169 |
| 5,832,112 A | * | 11/1998 | Funada et al. | 382/181 |
| 5,838,455 A | * | 11/1998 | Imaizumi et al. | 358/3.1 |
| 5,875,262 A | * | 2/1999 | Asada | 382/169 |
| 5,995,640 A | * | 11/1999 | Bolle et al. | 382/124 |
| 6,061,471 A | * | 5/2000 | Coleman, Jr. | 382/173 |
| 6,771,815 B2 | * | 8/2004 | Yang et al. | 382/169 |
| 7,221,780 B1 | * | 5/2007 | Wang | 382/118 |
| 2004/0246528 A1 | * | 12/2004 | Washio et al. | 358/3.06 |

FOREIGN PATENT DOCUMENTS

| | | |
|---|---|---|
| JP | 2000-66462 | 3/2000 |
| JP | 2000-357226 | 12/2000 |
| JP | 2003-198984 | 7/2003 |
| KR | 1999-25680 | 4/1999 |

* cited by examiner

*Primary Examiner* — Thomas D Lee
(74) *Attorney, Agent, or Firm* — Stanzione & Kim, LLP

(57) ABSTRACT

An image forming device to scan a predetermined document includes a uniform block search unit to classify the object into a plurality of blocks and to search for uniform blocks having uniform inner pixel values, a status information detection unit to detect representative values of the inner pixel values of each of the uniform blocks searched for by the uniform block search unit and to output maximum and minimum values of the representative values, and a control unit to determine that the object is uniform if a difference between the maximum and the minimum values output from the status information detection unit is less than a predetermined threshold value. Accordingly, if the object is uniform it is possible to compensate for deterioration of screen quality by unifying the pixels of the object.

30 Claims, 7 Drawing Sheets

IMAGE FORMING DEVICE TO DETERMINE UNIFORMITY OF IMAGE OBJECT AND METHOD THEREOF

CROSS-REFERENCE TO RELATED APPLICATIONS

This application claims benefit under 35 U.S.C. §119 from Korean Application No. 2004-88342, filed on Nov. 2, 2004, the disclosure of which is incorporated herein in its entirety by reference.

BACKGROUND OF THE INVENTION

1. Field of the Invention

The present general inventive concept relates to an image forming device and a method thereof. More particularly, the present general inventive concept relates to an image forming device and a method thereof to determine uniformity of an object and to perform processes according to the determination results in scanning a document including at least one object.

2. Description of the Related Art

Development of computer peripheral devices, such as various types of office equipment, continues to progress with the development of electronic technology. An image forming device, such as a scanner, a printer, and a copier, is a typical example. In particular, an image forming device consolidating diverse functions, such as scanning, printing, copying and facsimile transmission, is available.

An image forming device having a data scanning function, such as a scanner and a copier, generates data from a document by scanning the document. The document may be composed of various types of objects, such as text, graphic, photo, and drawing.

FIG. 1 is a diagram illustrating objects 11 and 12 on a document 10. Referring to FIG. 1, the objects 11 and 12 on the document 10 can be classified into a uniform object 11 and a non-uniform object 12 according to inner pixel values. If a difference between a maximum value and a minimum value of the inner pixels exists within a predetermined range, the object is classified as the uniform object 11 and if the difference is not within the predetermined range, the object is classified as the non-uniform object 12.

In a conventional image forming device, a clean scan may not be obtained when there are optical or mechanical defects, or due to surrounding environments. When this happens, image quality is deteriorated. This problem is especially aggravated with respect to the uniform object 11. That is, in the uniform object 11, if the inner pixel values are not scanned with a uniform brightness or color, but with a deviation of brightness or color, the surface of the uniform object 11 is stained. Consequently, if such a deteriorated scan image is printed, the objects are printed differently from an original state.

SUMMARY OF THE INVENTION

The present general inventive concept provides an image forming device and a method thereof capable of determining uniformity of an object of a scanned document by obtaining inner pixel values of the object.

The present general inventive concept also provides an image forming device and a method thereof capable of compensating inner pixel values of an object of a scanned document according to a determination of uniformity and non-uniformity of the object.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image forming device to scan a predetermined document represented by at least one object, the image forming device comprising a uniform block search unit to divide the object into a plurality of blocks and to search for one or more uniform blocks having uniform inner pixel values from the plurality of blocks, a status information detection unit to detect representative values of the inner pixel values of each of the uniform blocks searched for by the uniform block search unit and to output maximum and minimum representative values, and a control unit to determine that the object is uniform if a difference between the maximum and minimum representative values output from the status information detection unit is less than a predetermined threshold value.

The uniform block search unit may include a block processing unit to divide the object into the plurality blocks and a judging unit to select each of the plurality of blocks sequentially, to detect the inner pixel values of each block, and to judge the block to be uniform if a difference between maximum and minimum pixel values of the block is less than a second predetermined threshold value.

The uniform block search unit may further include a sampling unit to sample a predetermined number of pixels in the plurality of blocks divided by the block processing unit, such that the judging unit judges whether each of the plurality of blocks are uniform or not based on the sampled pixels.

The judging unit may judge that a block located between neighboring blocks, which are arranged continuously, to be a uniform block if the difference between the maximum pixel value and the minimum pixel value of each of block and the neighboring blocks is less than the second predetermined threshold value.

The status information detection unit may include a representative value detection unit to detect the representative value of each of the uniform blocks, a first register to store the maximum representative value of the detected representative values, a second register to store the minimum representative value of the detected representative values, and a sub control unit to compare the representative value of each of the uniform blocks with the stored maximum and minimum representative values, to update the stored maximum and minimum values of the first and second registers, respectively, and to output the update maximum and minimum values stored in the first and second registers, respectively.

The representative value detection unit detects the representative value of each of the uniform blocks using one of an average value of all pixels in each of the uniform blocks, a middle value of the pixel values of each of the uniform blocks, an average value of sampled pixels of each of the uniform blocks, a middle value of the sample pixel values of each of the uniform blocks, and a pixel value of a center pixel of each of the uniform blocks.

The control unit may judge the object to be uniform, if the difference between the maximum and minimum representative values is less than the predetermined threshold value and a ratio between a total number of blocks of the object and a number of the uniform blocks of the object is not less a predetermined threshold ratio.

The image forming device may further include an object compensation unit to compensate all pixels of the object to have a single pixel value when the control unit determines that the object is uniform.

The foregoing and/or other aspects of the present general inventive concept may also be achieved by providing an image forming device, including a scan unit to scan a document having at least one object, a uniform block detecting unit to divide the at least one object into a plurality of blocks and to detect uniform blocks of the plurality of blocks of the at least one object based on differences of pixels within each of the plurality of blocks, and an object uniformity detecting unit to determine whether the at least one object is uniform based on differences of pixels between the detected uniform blocks of the at least one object.

The foregoing and/or other aspects of the present general inventive concept may also be achieved by providing a scanning method of an image forming device to scan a document having at least one object, the method including dividing the object into a plurality of blocks and searching for uniform blocks having uniform inner pixel values, detecting representative values of the inner pixel values of each of the uniform blocks, and determining that the object is uniform if a difference between maximum and minimum values of the detected representative values is less than a predetermined threshold value.

The searching for the uniform blocks having the uniform inner pixel values may include selecting each of the plurality of blocks sequentially, detecting the inner pixel values of each of the plurality of blocks, and determining a block to be uniform if the difference between maximum and minimum pixel values of the block is less than a second predetermined threshold value.

The detecting of the inner pixel values of each of the plurality of blocks may include sampling a predetermined number of pixels of each of the plurality of blocks to be used to determine whether each of the plurality of blocks are uniform.

The searching for the uniform blocks having the uniform inner pixel values may further include determining that a block located neighboring blocks, which are arranged continuously, to be a uniform block if the difference between the maximum pixel value and the minimum pixel value of each of the block and the neighboring blocks is less than the second predetermined threshold value.

The detecting of the representative values of the inner pixel values of each of the uniform blocks may include detecting the representative values of each of the uniform blocks using one of an average value of all pixels in each of the uniform blocks, a middle value of pixel values of each of the uniform blocks, an average value of sampled pixels of each of the uniform blocks, a middle value of the sampled pixels of each of the uniform blocks, and a pixel value of a center pixel of each of the uniform blocks.

The determining that the object is uniform if the difference between the maximum and minimum values of the detected representative values is less than the predetermined threshold value may include comparing the representative values of each of the uniform blocks with previously-detected representative values and storing the maximum value and the minimum value of the compared representative values, sequentially confirming the representative values of each of the uniform blocks of the object and updating the maximum and minimum values of the representative values, judging the object to be non-uniform if the difference between the updated maximum value and the updated minimum value is not less than the predetermined threshold value, and judging the object to be uniform, upon completion of the confirmation of the representative values of each of the uniform blocks of the object if the difference between a final updated maximum value and a final updated minimum value is less than the predetermined threshold value.

The judging of the object to be uniform may further include calculating a ratio between a total number of blocks of the object and a number of the uniform blocks of the object, judging that the object is non-uniform if the calculated ratio is less than a predetermined threshold ratio, and judging that the object is uniform if the calculated ratio is not less than the predetermined threshold ratio.

The scanning method may further include compensating all pixels in the object to have a single pixel value if the object is determined to be uniform.

The foregoing and/or other aspects of the present general inventive concept may also be achieved by providing a method of controlling an image forming apparatus that scans a document including at least one object, the method including dividing the at least one object into a plurality of blocks, detecting uniform blocks of the plurality of blocks of the at least one object based on differences in pixel values within each of the plurality of blocks, and determining whether the at least one object is uniform based on differences in pixel values between the detected uniform blocks of the at least one object.

The foregoing and/or other aspects of the present general inventive concept may also be achieved by providing a method of controlling an image forming apparatus, the method including scanning a document including object data corresponding to at least one object, dividing the object data into a block data corresponding to a plurality of blocks, comparing pixel values of the block data of each of the plurality of blocks to detect uniform blocks, calculating a representative pixel value of each uniform block, and comparing the representative pixel values of the uniform blocks to determine a uniformity of the at least one object.

The foregoing and/or other aspects of the present general inventive concept may also be achieved by providing a computer readable recording medium having executable codes to perform a scanning method of an image forming device to scan a document having at least one object, the method including dividing the object into a plurality of blocks and searching for uniform blocks having uniform inner pixel values, detecting representative values of the inner pixel values of each of the uniform blocks, and determining that the object is uniform if a difference between maximum and minimum values of the detected representative values is less than a predetermined threshold value.

The foregoing and/or other aspects of the present general inventive concept may also be achieved by providing a computer readable recording medium having executable codes to perform a method of controlling an image forming apparatus that scans a document including at least one object, the method including dividing the at least one object into a plurality of blocks, detecting uniform blocks of the plurality of blocks of the at least one object based on differences in pixel values within each of the plurality of blocks, and determining whether the at least one object is uniform based on differences in pixel values between the detected uniform blocks of the at least one object.

The foregoing and/or other aspects of the present general inventive concept may also be achieved by providing a computer readable recording medium having executable codes to perform a method of controlling an image forming apparatus, the method including scanning a document including object data corresponding to at least one object, dividing the object data into a block data corresponding to a plurality of blocks, comparing pixel values of the block data of each of the plurality of blocks to detect uniform blocks, calculating a representative pixel value of each uniform block, and comparing the representative pixel values of the uniform blocks to determine a uniformity of the at least one object.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
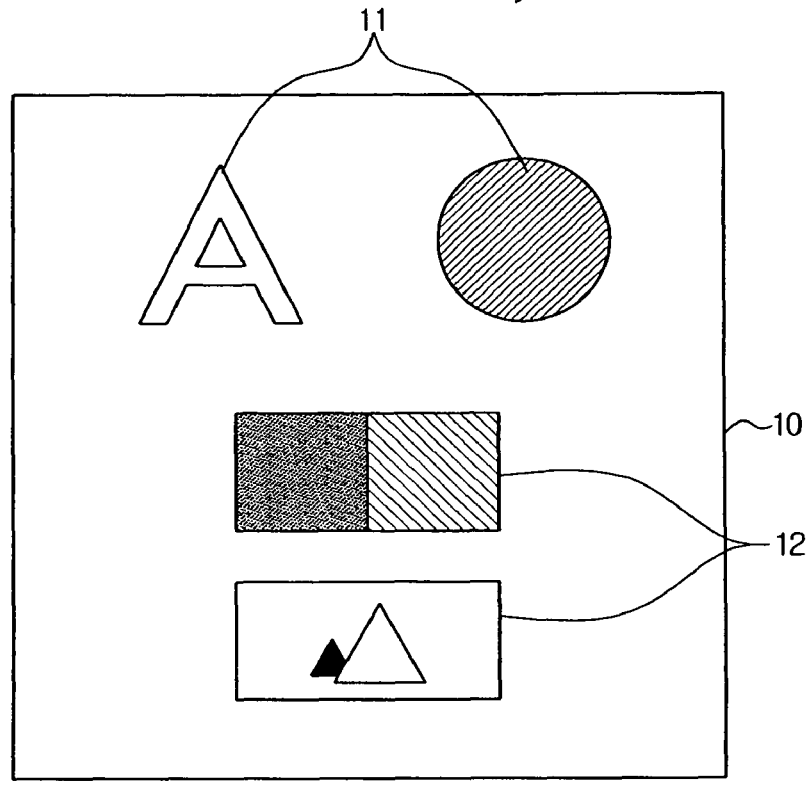
FIG. 1 is a diagram illustrating an example of a document including a uniform object and a non-uniform object.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
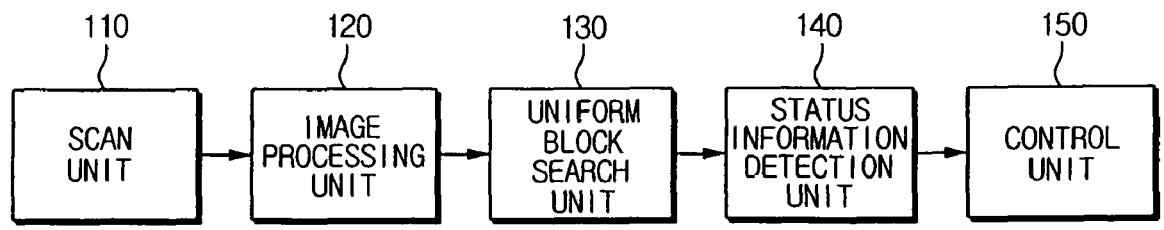
FIG. 2 is a block diagram illustrating a structure of an image forming device according to an embodiment of the present general inventive concept.

FIG. 2 is a block diagram illustrating a structure of an image forming device according to an embodiment of the present general inventive concept. Referring to FIG. 2, the image forming device includes a scan unit 110, an image processing unit 120, a uniform block search unit 130, a status information detection unit 140 and a control unit 150.

The scan unit 110 generates a scan data by scanning a document including at least one object. That is, the scan unit 110 can illuminate the document with lights, sense reflected lights using CCD (Charge Coupled Device) or CIS (Contact Image Sensor), convert the sensed lights into an electrical signal, and then convert the electrical signal into digital scan data by performing an A/D converting process on the electrical signal.

The image processing unit 120 detects object data forming each object of the document from the scan data output from the scan unit 110. The object data may be data that indicates a pixel value and coordinates of each pixel constituting each object.

The uniform block search unit 130 classifies or divides each object included in the document into a plurality of blocks, and then searches for uniform blocks of which inner pixel values are uniform. That is, when the object data detected in the image processing unit 120 is input to the uniform block search unit 130, the object data is classified into block data corresponding to the plurality of blocks, and a uniformity of each block is judged by determining a difference between a maximum pixel value and a minimum pixel value of the block data in each block. If the difference between the maximum pixel value and the minimum pixel value is not less than a predetermined first threshold value, the block is determined to be a non-uniform block, but if the difference between the maximum pixel value and the minimum pixel value is less than the predetermined first threshold value, the block is determined to be a uniform block. When a block is determined to be a uniform block, the determination result is input to the status information detection unit 140.

The status information detection unit 140 detects a representative value of each block determined to be a uniform block by the uniform block search unit 130 to indicate properties thereof, compares a representative value of a previously searched uniform block with the detected representative value of each block determined to be uniform by the uniform block search unit 130, and detects a maximum representative value and a minimum representative value of the detected representative values of the uniform blocks.

The control unit 150 determines that an object is a non-uniform object if a difference between the maximum representative value and the minimum representative value detected by the status information detection unit 140 is not less than a predetermined second threshold value.

On the other hand, if the difference between the maximum representative value and the minimum representative value is less than the predetermined second threshold value, the control unit 150 determines that the object is a uniform object.

Figure 3:
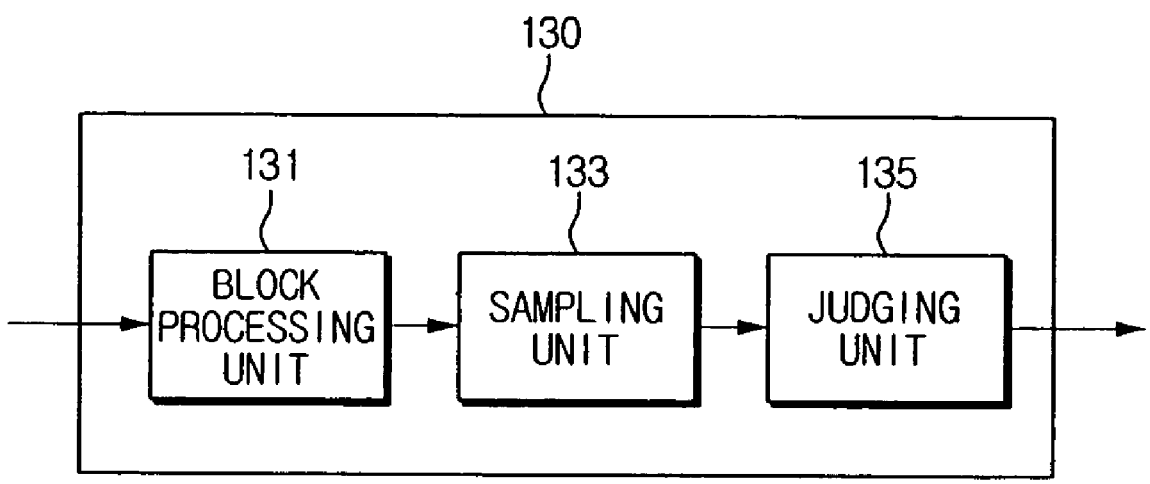
FIG. 3 is a block diagram illustrating a structure of a uniform block search unit of the image forming device of FIG. 2.

FIG. 3 is a block diagram illustrating an exemplary structure of the uniform block search unit 130 of the image forming device of FIG. 2. Referring to FIG. 3, the uniform block search unit 130 can include a block processing unit 131, a sampling unit 133, and a judging unit 135.

The block processing unit 131 divides each object of the document into the plurality of blocks. Each block includes a plurality of pixels. When the scanning of the document is completed and the scan data is generated by the scan unit 110, a plurality of block data is derived from the object data forming each object of the scan data.

The sampling unit 133 samples a predetermined number of blocks of the plurality of blocks classified by the block processing unit 131 or samples a predetermined number of pixels of the sampled block. That is, in order to judge whether uniformity exists in all the blocks forming one object, a heavy calculation load may be generated. Accordingly, the sampling unit 133 samples the predetermined number of the blocks to be used to determine whether uniformity exists in the object. Also, in order to judge whether uniformity exists in all the pixels forming one block, a heavy calculation load may be generated. Accordingly, the sampling unit 133 samples the predetermined number of the pixels to be used to determine whether uniformity exists in the block.

Figure 4A:
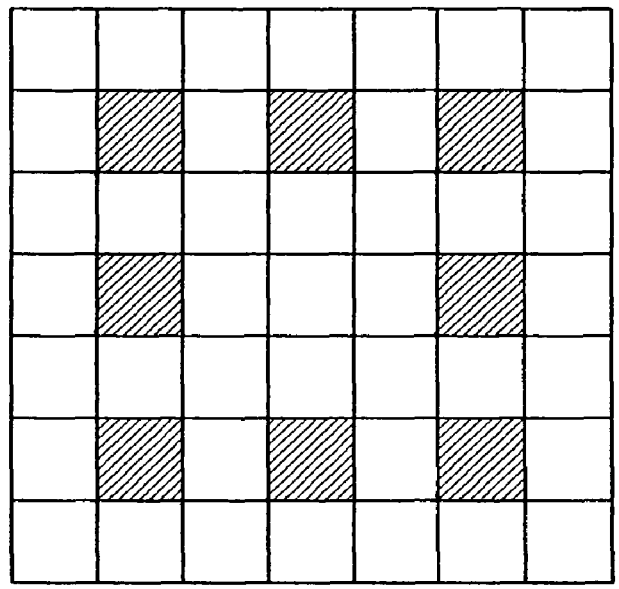
FIG. 4 is a diagram illustrating a state of sampling a predetermined number of pixels included in a predetermined number of blocks.
Figure 4B:
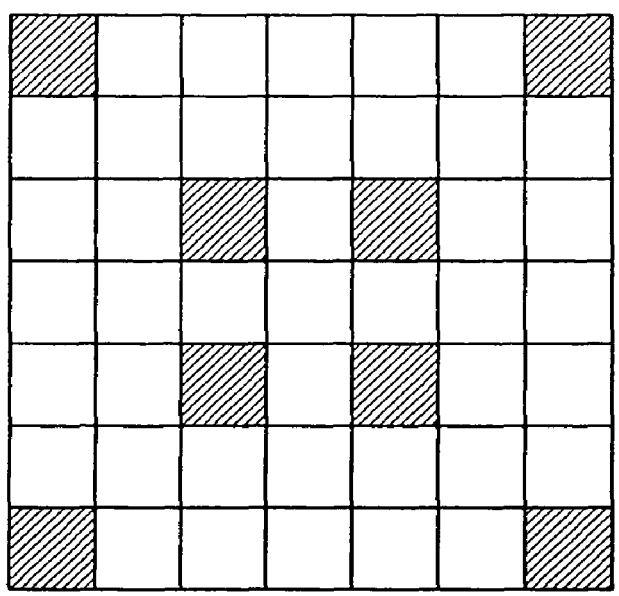
Figure 8:
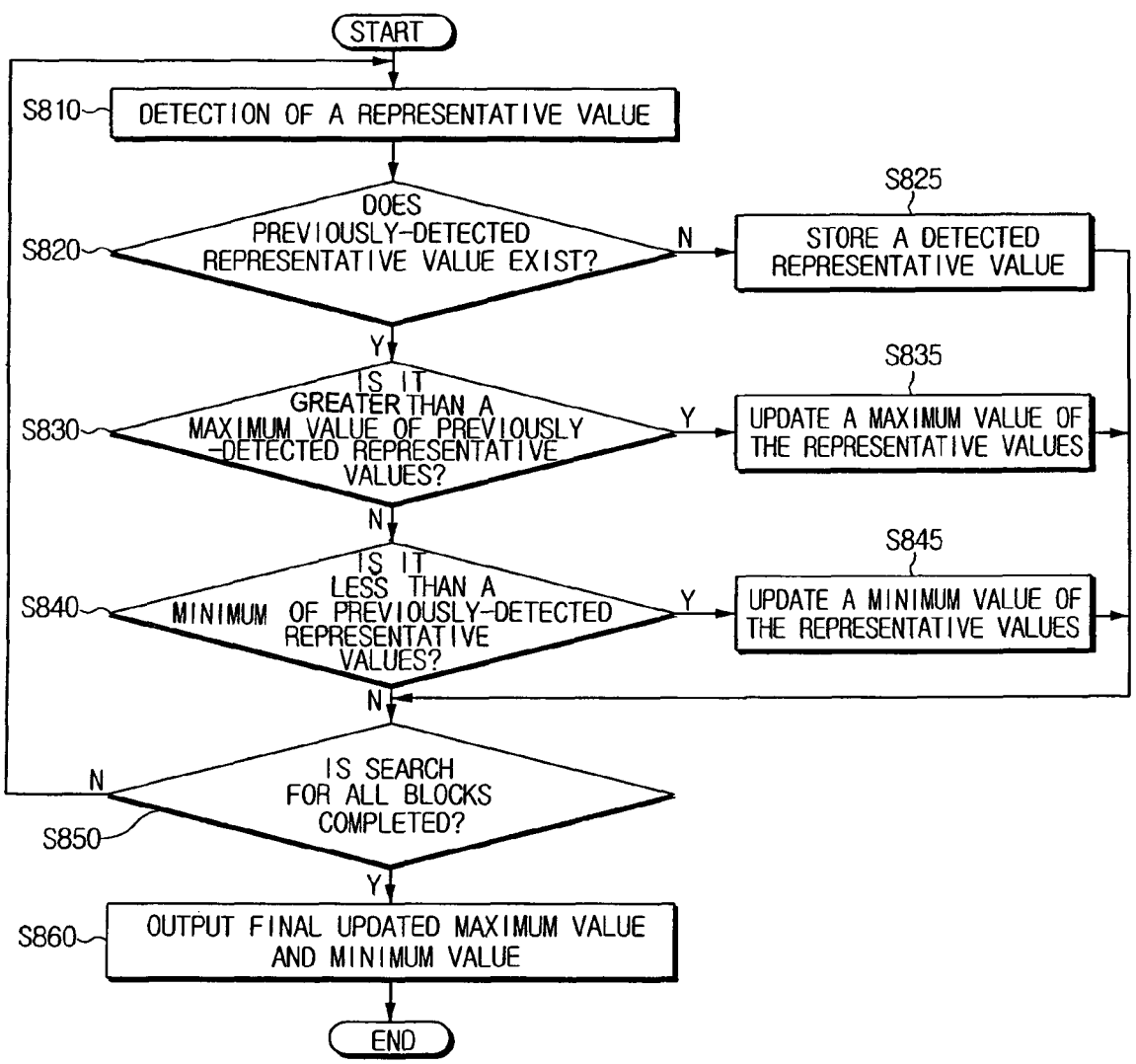
FIG. 8 is a flow chart illustrating a method of detecting a maximum value and a minimum value of representative values of a uniform block in an object according to an embodiment of the present general inventive concept.

FIGS. 4A and 4B are diagrams illustrating a status when sampling a predetermined number of pixels of a block formed by 7 by 7 pixels. In FIGS. 4A and 4B, 8 pixels are selected in one block. As illustrated in FIG. 4A, the uniform block search unit 130 can perform first sampling using first sample pixels and judge the uniformity of the block based on the first sample pixels. As illustrated in FIG. 4B, the uniform block search unit 130 can perform second sampling using second sample pixels and the uniformity of the block based on the second sample pixels. Accordingly, by performing the first sampling using the first sample pixels and the second sampling using the second sample pixels, a comparison calculation can be reduced as compared to performing one sampling simultaneously using the first and second pixels. That is, a method of sampling 8 pixels twice can reduce the comparison calculation as opposed to a method of sampling 16 pixels simultaneously. In FIGS. 4A and 4B, shaded squares represent the first and second sample pixels, respectively, and squares that are not shaded represent the remaining pixels in the block.

Referring back to FIG. 3, the judging unit 135 can detect the maximum pixel value and the minimum pixel value of a block based on all of the pixels in the block, or based on the pixels sampled by the sampling unit 133. The judging unit 135 calculates the difference between the maximum pixel value and the minimum pixel value of the block and determines whether the difference between the maximum pixel value and the minimum pixel value of the block is less than the predetermined first threshold value. If the difference between the maximum pixel value and the minimum pixel value of the block is determined not to be less than the predetermined first threshold value, the block is determined to be a non-uniform block. If the difference between the maximum pixel value and the minimum pixel value of the block is less than the predetermined first threshold value, the block is determined to be a uniform block.

According to another embodiment of the present general inventive concept, it is possible that the judging unit 135 can judge a block to be a uniform block when surrounding blocks are determined to be uniform. In a case in which there is much noise because of an inferior scan state, a block may be judged as a uniform block when it is actually not uniform. Accordingly, it is possible that the judging unit 135 can determine a block to be uniform only in a case that an error is not generated due to a noise by confirming surrounding blocks. For example, if the difference between the maximum pixel value and the minimum pixel value of each of consecutive first, second, and third blocks is less than the predetermined first threshold value, the second block is judged to be a uniform block because the second block and the first and third blocks adjacent to the second block are all determined to be uniform. In contrast, if the difference between the maximum pixel value and the minimum pixel value of a fourth block arranged next to the third block is greater than or equal to the predetermined first threshold value, the third block is judged to be a non-uniform block because an adjacent block (i.e., the fourth block) is determined to be non-uniform.

Figure 5:
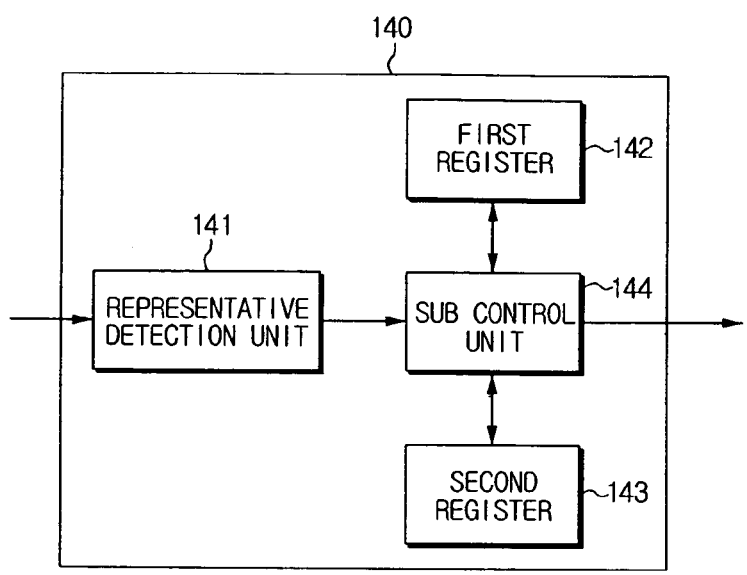
FIG. 5 is a block diagram an exemplary structure of a status information detection unit of the image forming device of FIG. 2.

FIG. 5 is a block illustrating an exemplary structure of the status information detection unit 140 of the image forming device of FIG. 2. Referring to FIG. 5, the status information detection unit 140 can include a representative detection unit 141, a first register 142, a second register 143, and a sub control unit 144.

The representative detection unit 141 detects the representative value of each block determined to be uniform by the uniform block search unit 130 to indicate the properties thereof. The representative detection unit 141 may detect a pixel value of a middle pixel located in a center of each uniform block as the representative value of the uniform block. Alternatively, considering noise, it may be possible to detect an average value of all the pixels in the uniform block or a middle value of the pixel values of all the pixels in the uniform block as the representative value. Further, it may be possible to detect an average value of the sampled pixels of the uniform block or a middle value of the pixel values of the sampled pixels of the uniform block as the representative value after sampling a predetermined number of pixels in the uniform block in order to improve a calculation speed.

The sub control unit 144 stores the representative values detected by the representative detection unit 141 into the first register 142 or the second register 143. That is, when the representative value is detected for a uniform block, it is determined whether a previously detected representative value exists or not. If the detected representative value is an initially detected representative value, the detected representative value may be stored into at least one of the first and second registers 142 and 143. When a next representative value is detected for another uniform block, the next representative value is compared with the previously detected representative value. The maximum representative value can be stored into the first register 142 and the minimum representative value can be stored into the second register 143. Accordingly, a confirmation process to confirm the representative value for all of the uniform blocks of the object is performed sequentially, and the first register 142 and the second register 143 are updated continuously.

Whenever the first register 142 and the second register 143 are updated, the sub control unit 144 can output the updated maximum representative value and minimum representative value to the control unit 150. Therefore, if the difference between the maximum representative value and the minimum representative value is not less than the predetermined second threshold value at any point in the confirmation process of the object, the control unit 150 can determine the object to be a non-uniform object.

It is also possible that the sub control unit 144 can output finally updated maximum and minimum values to the control unit 150 after the confirmation process to confirm the representative values for all of the uniform blocks is completed, instead of outputting the updated value to the control unit 150 whenever an update process is performed. Thus, the control unit 150 can judge the uniformity of the object only one time and a calculation load can be reduced.

Accordingly, the control unit 150 can determine the object to be a uniform object if the difference between the maximum representative value and the minimum representative value which are finally stored in the first register and second register 142 and 143 is less than the predetermined second threshold value.

Figure 6:
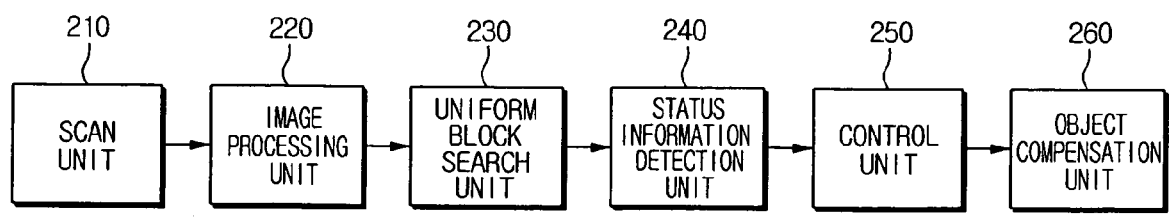
FIG. 6 is a block diagram illustrating a structure of an image forming device according to another embodiment of the present general inventive concept.

FIG. 6 is a block diagram illustrating a structure of an image forming device according to another embodiment of the present general inventive concept. Referring to FIG. 6, the image forming device includes a scan unit 210, an image processing unit 220, a uniform block search unit 230, a status information detection unit 240, a control unit 250 and an object compensation unit 260.

Operations of the scan unit 210, the image processing unit 220, the uniform block search unit 230, the status information detection unit 240, and the control unit 250 of FIG. 6 are similar to those of the scan unit 110, the image processing unit 120, the uniform block search unit 130, the status information detection unit 140, and the controller 150 of FIG. 2, respectively, and therefore the explanations thereof are omitted. The object compensation unit 260 is described below.

The object compensation unit 260 compensates an inner pixel value into a uniform pixel value for an object which is determined to be uniform by the control unit 250. It is possible to compensate for the deterioration of screen quality by unifying the pixels in the uniform object to have a single pixel value, even if noise is introduced during the scanning process. The object compensation unit 260 calculates an average of the representative values of all the uniform blocks in the object and uses calculated average of the representative values as the single pixel value. Alternatively, it may be possible to use a representative value which is detected most frequently among the representative values of all the uniform blocks in the object.

Even if the difference between the maximum representative value and the minimum representative value of each of the uniform blocks in the object is less than the predetermined second threshold value, when there are more than a predetermined number of non-uniform blocks, there is a possibility that the non-uniform blocks are not generated due to the noise, but due to the fact that the object is a non-uniform object itself. Therefore, according to another embodiment of the present general inventive concept, when the difference between the maximum representative value and the minimum representative value of each of the uniform blocks in the object is less than the predetermined second threshold value, the control unit 150 may judge a block to be a uniform block only if a ratio of a number of total blocks (N_BT) and a number (N_UB) of uniform blocks is greater than or equal to a predetermined threshold ratio (THP) value. That is, if (N_BT/N_UB≧THP) is satisfied, the object is a uniform object. On the contrary, it is also possible to judge uniformity of an object by determining whether a ratio between the number of total blocks and a number non-uniform blocks is less than the predetermined threshold rate.

Figure 7:
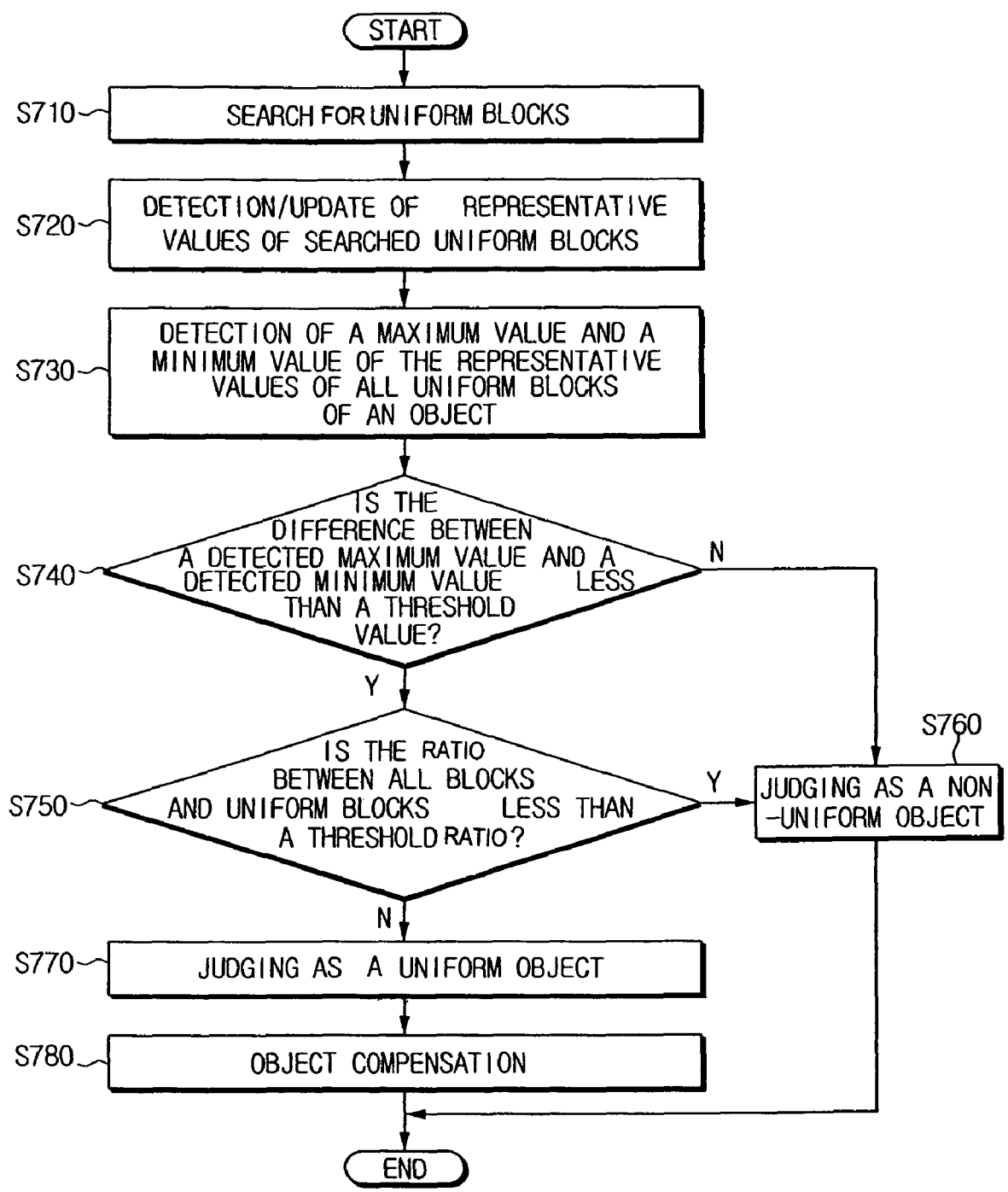
FIG. 7 is flow chart illustrating a scanning method of an image forming device according to an embodiment of the present general inventive concept.

FIG. 7 is flow chart illustrating a scanning method of an image forming device according to an embodiment of the present general inventive concept. Referring to FIG. 7, uniform blocks are searched for among a plurality of blocks forming an object (S710). That is, if a difference between a maximum pixel value and a minimum pixel value of pixels in a block is less than a predetermined first threshold value, the block is a uniform block.

A representative value of each uniform block is then detected, and previously detected representative values are updated (S720).

When the representative values of all the uniform blocks in the object are detected, a maximum representative value and a minimum representative value are detected (S730). It is then determined whether a difference between the detected maximum representative value and the detected minimum representative value is less than a predetermined second threshold value (S740). If the difference between the maximum representative value and the minimum representative value is determined not to be less than the predetermined second threshold value, the object is determined to be a non-uniform object (S760).

If the difference between the maximum representative value and the minimum representative value is determined to be less than the predetermined second threshold value, a ratio between a number of total blocks and a number of uniform blocks in the object is calculated, and it is determined whether the calculated ratio is less than a predetermined threshold ratio (S750). If the calculated ratio is less than the predetermined threshold ratio, the object is a non-uniform object (S760). If the calculated ratio is not less than the predetermined threshold ratio, the object is a uniform object (S770).

If the object is a uniform object, it is possible to perform object compensation to compensate all pixel values in the object to a common pixel value (S780). The common pixel value can be one of an average of the representative values of all of the uniform blocks of the object and a most frequently occurring representative value of the uniform blocks of the object.

FIG. 8 is a flow chart illustrating a method of detecting the maximum representative value and the minimum representative value of the uniform blocks of the object. Referring to FIG. 8, when a representative value is detected (S810), it is determined whether any previously-detected representative values exist or not (S820). If no previously-detected representative value exists, the detected representative value is stored (S825). If a first register to store the maximum representative value and a second register to store the minimum representative value are provided, the newly detected representative value may be stored in at least one of the first and second registers. If the previously-detected representative values exist, a maximum previously-detected representative value is compared with the detected representative value to determine whether the detected representative value is greater than the maximum previously-detected representative value (S830). If the detected representative value is larger than the maximum previously-detected representative value, the maximum representative value is updated as the detected representative value (S835). The updated maximum value can be stored in the first register.

If the detected representative value is not greater than the maximum previously-detected representative value, the detected representative value is then compared with a minimum previously-detected representative value to determine whether detected representative value is greater than the minimum previously-detected representative value (S840). If the detected representative value is less than the minimum previously-detected representative value, the minimum representative value is updated as the detected representative value (S845). The updated minimum value can be stored in the second register. It is then determined whether the representative value of each uniform block of the object has been detected (850). If it is determined that not all of the uniform blocks have been searched for the representative value, operations S810-S850 are repeated with another uniform block of the object. When it is confirmed that all uniform blocks of the object have been searched for the representative values thereof, the final updated maximum and minimum representative values are output from the first and second registers, respectively (S860).

Alternatively, it is possible to judge uniformity of the object whenever the maximum or minimum representative value is updated.

Figure 9:
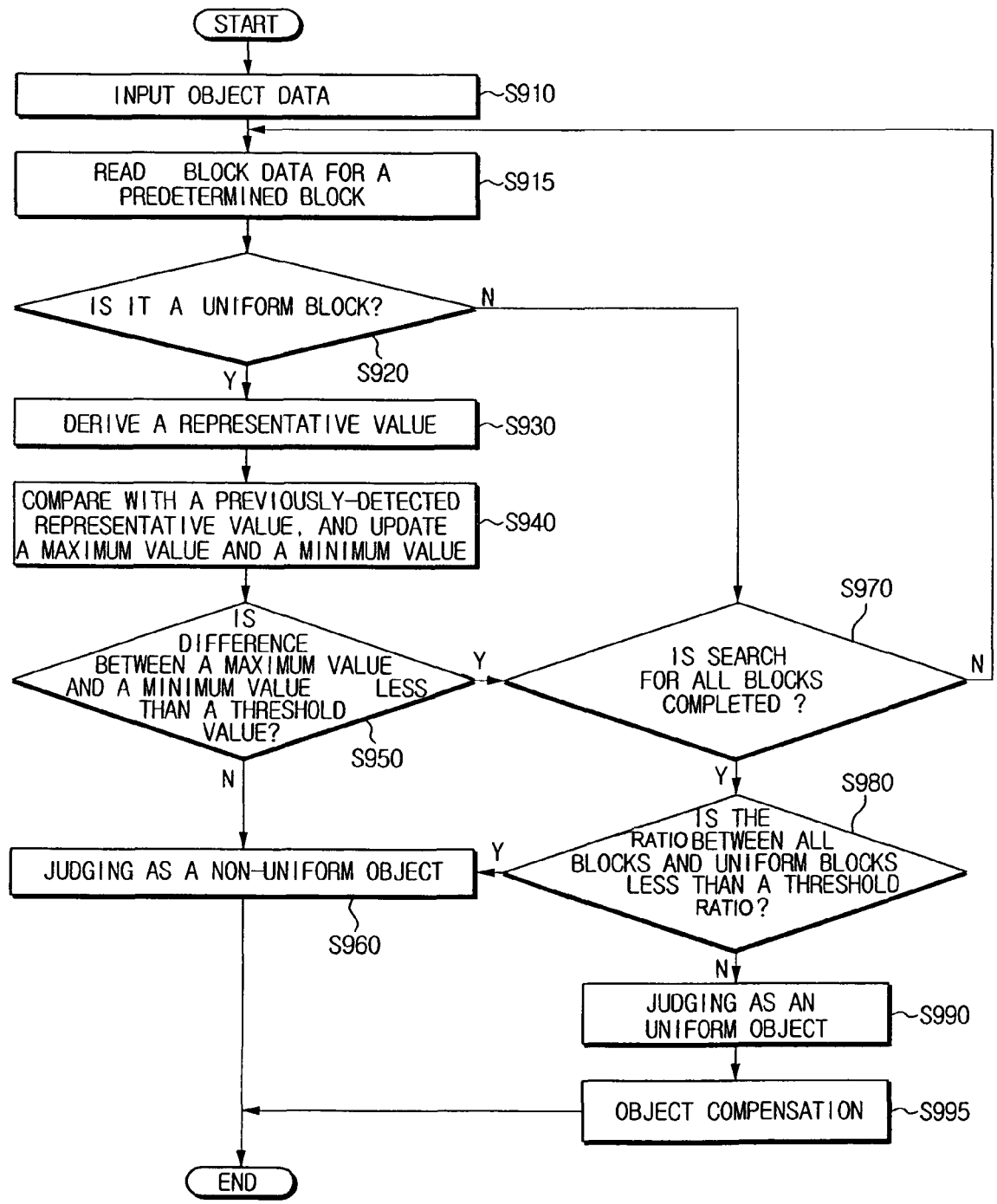
FIG. 9 is a flow chart illustrating a scanning method of an image forming device according to another embodiment of the present general inventive concept.

FIG. 9 is a flow chart illustrating judging uniformity of an object whenever updating of a maximum or minimum representative value is performed. Referring to FIG. 9, object data corresponding to the object is input (S910), block data of a block of the object is then read from the object data (S915), and it is determined whether the block is a uniform block or not (S920). It is possible to judge uniformity by comparing a difference between a maximum pixel value and a minimum pixel value in the block with a predetermined first threshold value. Accordingly, if the block is a non-uniform block, it is determined whether all the blocks have been searched for uniformity (S970). If any of the blocks of the object have not been searched, block data of a next block is read from the object date (S915), and then it is determined whether the block is uniform or not (S920). If the block is a uniform block, a representative value of the block is derived (S930). The representative value is compared with a previously-detected representative value, and then a maximum representative value and a minimum representative value are updated (S940). Since an example of the updating method is described above with reference to FIG. 8, an explanation thereof is omitted for the sake of brevity. When the update is performed, storage values of first and second registers (i.e., the maximum and minimum representative values) are compared, and it is determined whether a difference between the maximum representative value and the minimum representative value is less than a predetermined second threshold value (S950). If the difference between the maximum representative value and the minimum representative value is not less than the predetermined second threshold value, the object is determined to be a non-uniform object (S960).

If the difference between the maximum representative value and the minimum representative value is less than the predetermined second threshold value, it is determine whether a search for all of the blocks of the object is completed or not (S970). Until the completion of search for all of the blocks of the object, operations S915-S950 are performed repeatedly. When the search for all of the blocks of the object is completed, it is determined whether a ratio between a number of total blocks and a number of uniform blocks in the object is less than a predetermined threshold ratio value (S980). If the ratio between the number of total blocks and the number of uniform blocks in the object is less than the predetermined threshold ratio value, the object is determined to be a non-uniform object (S960). If the ratio between the number of total blocks and the number of uniform blocks is not less than the predetermined threshold ratio value, the object determined to be is a uniform object (S990).

If the object is determined to be a uniform object, it is possible perform object compensation to compensate all pixel values in the object to a predetermined single pixel value (S995). An average value of the representative values of the uniform blocks of the object or a most frequently occurring value of the representative values of the uniform blocks of the object may be used as the single pixel value.

The present general inventive concept may be embodied in hardware, software, or a combination thereof. For example, the present general inventive concept may be embodied by a computer running a program from a computer-readable medium, including but not limited to storage media such as magnetic storage media (ROMs, RAMs, floppy disks, magnetic tapes, etc.), optically readable media (CD-ROMs, DVDs, etc.), and devices to transmit carrier waves (transmission over the internet via servers or other hardware). The present general inventive concept may be embodied as a computer-readable medium having a computer-readable program code to cause a number of computer systems connected via a network to effect distributed processing.

As described above, according to the embodiments of the present general inventive concept, in scanning a document including at least one object, it is possible to judge uniformity of the object. Accordingly, if the object is a uniform object, it is possible to compensate for deterioration of screen quality by unifying the pixels in the object to a single pixel value. Consequently, quality of an output image can be improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. An image forming device to scan a document having at least one object, the image forming device comprising:
   a uniform block search unit to divide the object into a plurality of blocks and to search for one or more uniform blocks having uniform inner pixel values from the plurality of blocks;
   a status information detection unit to detect a representative value of each of the uniform blocks, the representative value based on the inner pixel values of each respective uniform block, and to output a maximum representative value and a minimum representative of the representative values among all of the uniform blocks of the object; and
   a control unit to determine that the object is uniform if a difference between the maximum and minimum representative values output from the status information detection unit is less than a first predetermined threshold value.

2. The image forming device of claim 1, wherein the uniform block search unit comprises:
   a block processing unit to divide the object into the plurality of blocks; and
   a judging unit to select each of the plurality of blocks sequentially to detect the inner pixel values of each block, and to judge the block to be uniform if a difference between a maximum and a minimum pixel value of the block is less than a second predetermined threshold value.

3. The image forming device of claim 2, wherein the uniform block search unit further comprises:
   a sampling unit to sample a predetermined number of pixels less than a total number of all the pixels of each respective block in the plurality of blocks divided by the block processing unit, such that the judging unit judges whether each of the plurality of blocks is uniform or not based on the sampled pixels.

4. The image forming device of claim 2, wherein the judging unit judges that a block located between neighboring blocks, which are arranged continuously, to be a uniform block if the difference between the maximum pixel value and the minimum pixel value of each of the block and the neighboring blocks is less than the second predetermined threshold value.

5. The image forming device of claim 1, wherein the status information detection unit comprises:
   a representative value detection unit to detect the representative value of each of the uniform blocks;
   a first register to store the maximum representative value among all of the detected representative values;
   a second register to store the minimum representative value among all of the detected representative values; and
   a sub control unit to compare the representative value of each of the uniform blocks with the stored maximum and minimum representative values, to update the stored maximum and minimum representative values of the first and second registers, respectively, and to output the updated maximum and minimum representative values stored in the first and second registers, respectively.

6. The image forming device of claim 5, wherein the representative value detection unit detects the representative value of each of the uniform blocks using one of:
   an average value of all pixels in each of the uniform blocks;
   a middle value of the pixel values of each of the uniform blocks;
   an average value of sampled pixels of each of the uniform blocks;
   a middle value of the sample pixel values of each of the uniform blocks; and
   a pixel value of a center pixel of each of the uniform blocks.

7. The image forming device of claim 1, wherein the control unit judges the object to be uniform if the difference between the maximum representative value and the minimum representative value is less than the predetermined threshold value and a ratio between a total number of blocks of the object and a number of the uniform blocks of the object is not less than a predetermined threshold ratio.

8. The image forming device of claim 1, further comprising:
an object compensation unit to compensate all pixels of the object to have a single pixel value when the control unit determines that the object is uniform.

9. The image forming device of claim 8, wherein the single pixel value comprises one of an average value of the representative values of the uniform blocks and a most frequently occurring value of the representative values of the uniform blocks.

10. An image forming device, comprising:
a scan unit to scan a document having at least one object;
a uniform block detecting unit to divide the at least one object into a plurality of blocks and to detect uniform blocks of the plurality of blocks of the at least one object based on differences of pixels within each respective block of the plurality of blocks;
a status information detection unit to detect a representative value of each of the uniform blocks, the representative value based on the inner pixel values of each respective uniform block, and to output a maximum representative value and a minimum representative of the representative values among all of the uniform blocks of the object; and
a control unit to determine that the object is uniform if a difference between the maximum and minimum representative values output from the status information detection unit is less than a first predetermined threshold value,
wherein the uniform block detecting unit detects a maximum pixel value and a minimum pixel value of each of the plurality of blocks, calculates a difference between the maximum pixel value and the minimum pixel value of each respective block, compares the difference to a predetermined threshold value, and determines each respective block of the plurality of blocks to be uniform if the difference between the maximum pixel value and the minimum pixel value of each respective block is less than the predetermined threshold value.

11. The image forming device of claim 10, further comprising:
a compensation unit to control all pixels of the at least one object to have a common pixel value if the at least one object is determined to be uniform by the object uniformity detecting unit.

12. The image forming device of claim 10, wherein the uniform block detecting unit detects the maximum pixel value and the minimum pixel value of each block based on a predetermined number of sampled pixels of each block less than a total number of all the pixels of each respective block.

13. The image forming device of claim 10, wherein the object uniformity detecting unit calculates a ratio of a total number of the plurality of blocks of the at least one object to a number of the uniform blocks of the at least one object, compares the calculated ratio to a predetermined threshold ratio, and determines that the at least one object is uniform if the difference between the maximum and minimum values of the representative pixel values is less than the predetermined threshold value and the calculated ratio is greater than or equal to the predetermined threshold ratio.

14. A scanning method of an image forming device to scan a document having at least one object, the method comprising:
dividing the object into a plurality of blocks and searching for uniform blocks having uniform inner pixel values;
detecting representative values of each of the uniform blocks based on inner pixel values of each uniform block, respectively; and
determining that the object is uniform if a difference between a maximum representative value of all of the representative values and a minimum representative among all of the detected representative values is less than a predetermined threshold value.

15. The scanning method of claim 14, wherein the searching for the uniform blocks having the uniform inner pixel values comprises:
selecting each of the plurality of blocks sequentially and detecting the inner pixel values of each of the plurality of blocks; and
determining a block to be uniform if a difference between a maximum pixel value and a minimum pixel value of the block is less than a second predetermined threshold value.

16. The scanning method of claim 15, wherein the detecting of the inner pixel values of each of the plurality of blocks comprises:
sampling a predetermined number of pixels less than a total number of all the pixels of each respective block of the plurality of blocks to be used to determine whether each of the plurality of blocks are uniform.

17. The scanning method of claim 15, wherein the searching for the uniform blocks having the uniform inner pixel values further comprises:
determining that a block located between neighboring blocks, which are arranged continuously, to be a uniform block if the difference between the maximum pixel value and the minimum pixel value of each of the block and the neighboring blocks is less than the second predetermined threshold value.

18. The scanning method of claim 14, wherein the detecting of the representative values of the inner pixel values of each of the uniform blocks comprises detecting the representative values of each of the uniform blocks using one of:
an average value of all pixels in each of the uniform blocks;
a middle value of pixel values of each of the uniform blocks;
an average value of sampled pixels of each of the uniform blocks;
a middle value of the sampled pixels of each of the uniform blocks; and
a pixel value of a center pixel of each of the uniform blocks.

19. The scanning method of claim 14, wherein the determining that the object is uniform if the difference between the maximum and minimum values of the detected representative values is less than the predetermined threshold value comprises:
comparing the representative values of each of the uniform blocks with previously-detected representative values, and storing the maximum value and the minimum value among all of the compared representative values;
sequentially confirming the representative values of each of the uniform blocks of the object, and updating the maximum representative value and the minimum representative value;

judging the object to be non-uniform if the difference between the updated maximum value and the updated minimum value is not less than the predetermined threshold value; and judging the object to be uniform upon completion of the confirmation of the representative values of each of the uniform blocks of the object if the difference between a final updated maximum value and a final updated minimum value is less than the predetermined threshold value.

20. The scanning method of claim 19, wherein the judging of the object to be uniform further comprises:

calculating a ratio between a total number of blocks of the object and a number of the uniform blocks of the object;

judging that the object is non-uniform if the calculated ratio is less than a predetermined threshold ratio; and judging that the object is uniform if the calculated ratio is not less than the predetermined threshold ratio.

21. The scanning method of claim 14, further comprising:

compensating all pixels in the object to have a single pixel value if the object is determined to be uniform.

22. A method of controlling an image forming apparatus that scans a document including at least one object, the method comprising:

dividing the at least one object into a plurality of blocks;

detecting uniform blocks of the plurality of blocks of the at least one object based on differences in pixel values within each respective block of the plurality of blocks;

detecting representative values of each of the uniform blocks based on inner pixel values of each uniform block, respectively; and determining that the object is uniform if a difference between a maximum representative value of all of the representative values and a minimum representative among all of the detected representative values is less than a predetermined threshold value, wherein the detecting of the uniform blocks of the at least one object comprises:

detecting a maximum pixel value and a minimum pixel value in each of the plurality of blocks;

calculating a difference between the detected maximum and minimum pixel values; and determining each of the plurality of blocks to be uniform if the calculated difference between the detected maximum and minimum pixel values of each block is less than a predetermined threshold value.

23. The method of claim 22, further comprising:

controlling each pixel of the at least one object to have a common pixel value if the at least one object is determined to be uniform.

24. The method of claim 22, wherein the detecting of the maximum pixel value and the minimum pixel value comprise:

sampling a predetermined number of pixels less than a total number of all the pixels of each respective block of the plurality of blocks; and determining the maximum pixel value and the minimum pixel value based on the sampled pixels.

25. The method of claim 22, wherein the determining of whether the at least one object is uniform further comprises:

calculating a ratio of a total number of the plurality of blocks of the at least one object to a number of the uniform blocks of the at least one object;

comparing the calculated ratio to a predetermined threshold ratio; and determining the at least one object to be uniform if the difference between the maximum representative value and the minimum representative value is less than the predetermined threshold value and the calculated ratio is greater than or equal to the predetermined threshold ratio.

26. A method of controlling an image forming apparatus, the method comprising:

scanning a document, the document including object data corresponding to at least one object;

dividing the object data into a block data corresponding to a plurality of blocks;

comparing pixel values of the block data of each of the plurality of blocks to detect uniform blocks;

calculating a representative pixel value of each uniform block;

determining a maximum representative pixel value and a minimum representative pixel value among all of the representative pixel values of all of the uniform blocks;

calculating a difference between the maximum representative pixel value and the minimum representative pixel value; and comparing the difference to a predetermined threshold value to determine a uniformity of the at least one object.

27. The method of claim 26, wherein the calculating of the representative pixel value of each block comprises:

determining one of an average of the pixel values of each block, a median of the pixel values of each block, and a value of a pixel disposed at a center of each block.

28. A non-transitory computer readable recording medium having executable codes to perform a scanning method of an image forming device to scan a document having at least one object, the method comprising:

dividing the object into a plurality of blocks and searching for uniform blocks having uniform inner pixel values;

detecting representative values of the inner pixel values of each of the uniform blocks;

determining a maximum representative value and a minimum representative value among all of the representative values of all of the uniform blocks;

calculating a difference between the maximum representative value and the minimum representative value;

comparing the difference to a predetermined threshold; and determining that the object is uniform if the difference between the maximum representative value and the minimum representative value of the detected representative values is less than the predetermined threshold value.

29. A non-transitory computer readable recording medium having executable codes to perform a method of controlling an image forming apparatus that scans a document including at least one object, the method comprising:

dividing the at least one object into a plurality of blocks;

detecting uniform blocks of the plurality of blocks of the at least one object based on differences in pixel values within each respective block of the plurality of blocks;

determining a maximum representative pixel value and a minimum representative pixel value among all of the representative pixel values of all of the uniform blocks;

calculating a difference between the maximum representative pixel value and the minimum representative pixel value; and comparing the difference to a predetermined threshold value to determine a uniformity of the at least one object, wherein the detecting of the uniform blocks of the at least one object comprises:

detecting a maximum pixel value and a minimum pixel value in each of the plurality of blocks;

calculating a difference between the detected maximum and minimum pixel values; and determining each of the plurality of blocks to be uniform if the calculated difference between the detected maximum and minimum pixel values of each block is less than a predetermined threshold value.

30. A non-transitory computer readable recording medium having executable codes to perform a method of controlling an image forming apparatus, the method comprising:

scanning a document, the document including object data corresponding to at least one object;

dividing the object data into a block data corresponding to a plurality of blocks;

comparing pixel values of the block data of each of the plurality of blocks to detect uniform blocks;

calculating a representative pixel value of each uniform block;

determining a maximum representative pixel value and a minimum representative pixel value among all of the representative pixel values of all of the uniform blocks;

calculating a difference between the maximum representative pixel value and the minimum representative pixel value; and comparing the difference to a predetermined threshold value to determine a uniformity of the at least one object.

* * * * *